United States Patent
Lindee

(10) Patent No.: US 6,454,559 B1
(45) Date of Patent: Sep. 24, 2002

(54) FOOD PATTY-MOLDING APPARATUS HAVING MOLD PLATE WITH MULTIPLE ROWS OF CAVITIES

(75) Inventor: Scott A. Lindee, Mokena, IL (US)

(73) Assignee: Formax, Inc., Mokena, IL (US)

(*) Notice: Subject to any disclaimer, the term of this patent is extended or adjusted under 35 U.S.C. 154(b) by 0 days.

(21) Appl. No.: 09/790,931

(22) Filed: Feb. 22, 2001

(51) Int. Cl.[7] .................................................. B29C 45/18
(52) U.S. Cl. ........................ 425/572; 425/574; 425/575
(58) Field of Search ................................ 425/572, 574, 425/575, 556

(56) References Cited

U.S. PATENT DOCUMENTS

| | | |
|---|---|---|
| 3,887,964 A | 6/1975 | Richards |
| 4,182,003 A | 1/1980 | Lamartino et al. |
| 4,187,581 A * | 2/1980 | Wagner ........................ 425/556 |
| 4,272,864 A | 6/1981 | Holly |
| 4,338,702 A * | 7/1982 | Holly .......................... 425/556 |
| 4,356,595 A | 11/1982 | Sandberg et al. |
| 4,372,008 A | 2/1983 | Sandberg |
| 4,418,446 A | 12/1983 | Sandberg et al. |
| 4,597,135 A | 7/1986 | Holly et al. |
| 4,768,941 A | 9/1988 | Wagner |
| 4,821,376 A | 4/1989 | Sandberg |
| 4,872,241 A | 10/1989 | Lindee |
| 5,730,650 A | 3/1998 | Soper |
| 6,132,199 A * | 10/2000 | Chierici et al. ............. 425/233 |

OTHER PUBLICATIONS

Admitted Prior Art: 1971 "F–26 Original Double Row".

* cited by examiner

Primary Examiner—Tim Heitbrink
(74) Attorney, Agent, or Firm—Polit & Associates,LLC

(57) ABSTRACT

A mold plate assembly for a patty-forming apparatus includes a reciprocating mold plate having patty-forming cavities, with at least two rows of cavities aligned in a longitudinal direction, and a fill hole located rearwardly of the cavities. The assembly includes a bottom fill plate and a top fill plate structure arranged facing opposite sides of the mold plate. The mold plate reciprocates between a cavity fill position and a patty discharge or knock-out position. Outlet slots are arranged through the top fill plate structure to deliver food product into said mold cavities when the mold plate is in the fill position. During filling of food product into the cavities, a pressurized food product flow distribution path is established through the bottom fill plate, through the fill hole of the mold plate, through the top fill plate structure, through the outlet slots and into the cavities. The fill hole is reciprocated between an open and a closed position with the mold plate, to either allow food product into the mold cavities when the mold plate is in the fill position, or to prevent flow through the outlet slots when the mold plate is in the closed position. The mold plate assembly allows for the use of multiple rows of cavities in the mold plate and ensures consistent filling in both the rearward and forward rows of cavities.

16 Claims, 7 Drawing Sheets

FOOD PATTY-MOLDING APPARATUS HAVING MOLD PLATE WITH MULTIPLE ROWS OF CAVITIES

TECHNICAL FIELD OF THE INVENTION

The present invention relates to food patty-molding machines. The invention particularly relates to food patty-molding machines which incorporate a reciprocating mold plate having patty-forming cavities which are cyclically filled to form patties, and then emptied, the patties being discharged to a patty-receiving area.

BACKGROUND OF THE INVENTION

Food patty-forming or molding machines are described, for example, in U.S. Pat. Nos. 3,887,964; 4,372,008 and 4,821,376. A typical food patty-forming machine or apparatus 20 is illustrated in FIG. 1. This machine is described in detail in U.S. Pat. No. 3,887,964 and has been marketed as the FORMAX 26 machine by Formax, Inc., of Mokena, Ill. Molding machine 20 includes a machine base 21 which supports the operating mechanisms of the machine and contains hydraulic actuating systems, electrical actuating systems, and most of the machine controls.

The food patty-molding machine 20 includes a supply means 24 for storing and supplying a moldable food product, such as ground beef, fish, pork, chicken, potatoes, or the like, to the processing mechanisms of the machine. Supply means 24 includes a large food product storage hopper 25 that supplies a food pump system 26. System 26 includes two alternately operating food pumps (one shown); other machines typically include only a single food pump. The two food pumps continuously pump food, under pressure, into a valve manifold connected to a cyclically operable molding station 28. Molding station 28 includes a multi-cavity mold plate 32 that moves cyclically between a fill position, shown in FIG. 1, and a discharge position in which its mold cavities are outside of station 28, aligned with a set of knock-out cups 33.

Food supply means 24 includes a conveyor belt 31 that extends completely across the bottom of hopper 25. In FIG. 1, a limited supply of food product 38 is shown in hopper 25; a much greater supply could be stored in the hopper without exceeding its capacity. The forward end of hopper 25 communicates with a vertical hopper outlet 39 that leads downwardly into two pump chambers; only one pump chamber 69 is shown. Three motors drive three vertical feed screws. Only one motor 47 and one feed screw 53 are shown in FIG. 1.

The upper part of a pump housing 71 comprises a plate 81 that supports the mold plate 32. The mold plate 32 includes a plurality of individual mold cavities 86 distributed in a single row across the width of the mold plate; mold cavities 86 are alignable with the manifold outlet fill passage 79. A mold cover 82 is disposed immediately above mold plate 32, closing off the top of each of the mold cavities 86. The mold cover 82 may include a conventional breather plate. Suitable spacers (not shown) are provided to maintain the spacing between the cover 82 and the support plate 81, essentially equal to the thickness of the mold plate 32. A housing 88 is positioned over the cover plate 82. The housing 88 encloses the operating mechanism (not shown) for the knock-out cups 33.

In the operation of the patty-molding machine 20, a supply of ground meat or other moldable food product 38 is placed into the hopper 25, and is advanced toward the hopper outlet 39 by the conveyor 31. Whenever one of the food pump plungers, such as the plunger 68, is retracted to expose a pump cavity (e.g., the cavity 69), the vertical feed screws 53 aligned with that pump cavity are actuated to feed the food product into the pump cavity.

In FIG. 1, pumping system 26 is illustrated with the mold plate 32 in its fill position, and with the pump 61 pumping the moldable food product through the manifold 27. The pump 61, as shown, has just begun its pumping stroke, and has compressed the food product in pump cavity 69, forcing it under pressure into the manifold 27. As operation of the machine 20 continues, the plunger 68 advances and food product flows into the mold cavities 126, there is a relatively constant pressure on the food product and chamber 69, manifold 27, fill passage 79, and cavities 86.

In describing the operation of molding mechanism 28, and particularly the mold plate 32, it is convenient to start with the mold plate 32 in the fill position in FIG. 1. In each molding cycle, mold plate 32 remains in this fill position for a limited dwell interval. As the mold cavities 86 move into the fill position, one of the two food pumps of machine 20 pumps food product through manifold 27 and fill passage 79, filling the mold cavities. To assure complete filling of the mold cavities, the food pump must apply a substantial pressure to the food product.

Following the fill dwell interval, mold plate 32 is moved outwardly, to the right from its fill position, as shown in FIG. 1, until it reaches a discharge position with its mold cavities 86 aligned with knock-out cups 33. As mold plate 32 moves toward its discharge position, mold cavities 86 all move clear of fill passage 79 before any part of those cavities projects out of mold station 28, beyond support plate 81 and cover 82. Thus, the food pump in machine 20, as shown in FIG. 1, remains sealed off at all times. A second dwell interval occurs at the discharge position of mold plate 32, during which knock-out cups 33 move downwardly through the mold cavities, discharging the molded food patties onto a patty-receiving area, e.g. a take off conveyor (not shown).

Following discharge of the molded food patties, mold plate 32 is moved back toward its fill position so that mold cavities 86 can again be filled with food product. Again, mold cavities 86 are completely inside molding mechanism 28, sealed off, before they come into alignment with fill passage 79.

Although a single fill passage 79 is shown in FIG. 1, it is also known to provide multiple fill orifices which together are substantially coextensive with the area of the cavities, such as described in U.S. Pat. Nos. 4,356,595; 4,821,376 and 4,372,008.

The present inventor has recognized that the throughput (quantity of patties per time period of machine operation), of food patties formed by the aforementioned food patty-forming machine is limited by the speed of the machine and the number of cavities that can be aligned across the single row. The present inventor has recognized that it would be desirable that the throughput of such a machine be increased, while maintaining a consistent quality of the patties formed by such a machine.

SUMMARY OF THE INVENTION

The invention provides a mold plate assembly for a patty-forming apparatus that includes a reciprocating mold plate having patty-forming cavities, with at least two rows of cavities aligned in a longitudinal direction. The mold plate reciprocates between a cavity fill position and a patty discharge or knock-out position. The mold plate includes a fill hole. The assembly includes a top fill plate structure and a bottom fill plate arranged facing opposite sides of the mold plate. Front and rear outlet slots are arranged through the top fill plate structure to fill food product into the mold cavities when the mold plate is in the fill position. During filling of food product into the cavities, a pressurized food product flow distribution path is established through the bottom fill plate, through the fill hole of the mold plate, through the top fill plate structure, through the outlet slots, and into the cavities. The fill hole is reciprocated between an open and a closed position with the reciprocating mold plate, to either allow food product into the mold cavities when the mold plate is in the fill position, or to prevent pressurized flow through the fill openings when the mold plate is in the closed position.

According to the invention, the rearward row of cavities is not thereby exposed to pressurized food product from front outlet slots during retraction or extension of the rearward cavities during mold plate reciprocation. Thus, the forward row of mold cavities is exposed to only the pressurized front outlet slots during the filling interval; and the rearward row of cavities is exposed to only the pressurized front outlet slots during the filling interval. In this way, the rearward row of cavities which pass by the front outlet slots is not over-filled or over-pressured by being exposed to pressurized front outlet slots before or after filling by the corresponding rear outlet slots.

According to the invention, the production of food patties by the patty-forming apparatus per operating period is effectively doubled compared to an apparatus with a single row of mold cavities. The mold plate assembly allows for the use of multiple rows of cavities in the mold plate and ensures consistent filling in both the rearward and forward rows of cavities. Each row of cavities is filled simultaneously without any row of cavities being over-filled, or over-pressured. The resultant food patties will have a consistent quality and density, and a resultant consistent cooking time.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
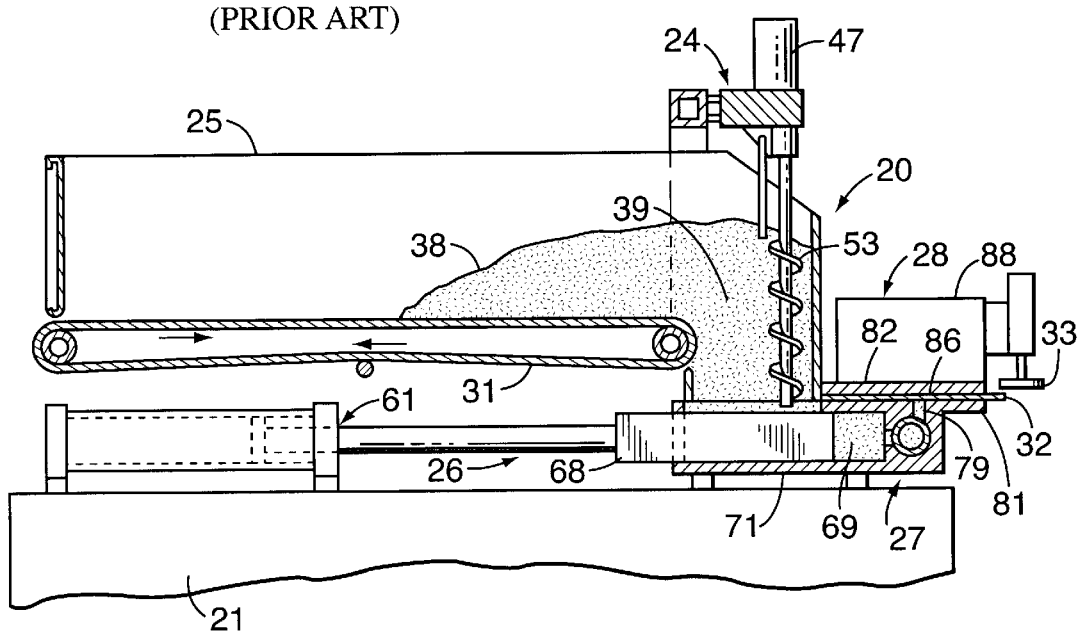
FIG. 1 is a diagrammatic sectional view of a prior art food patty-forming apparatus.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
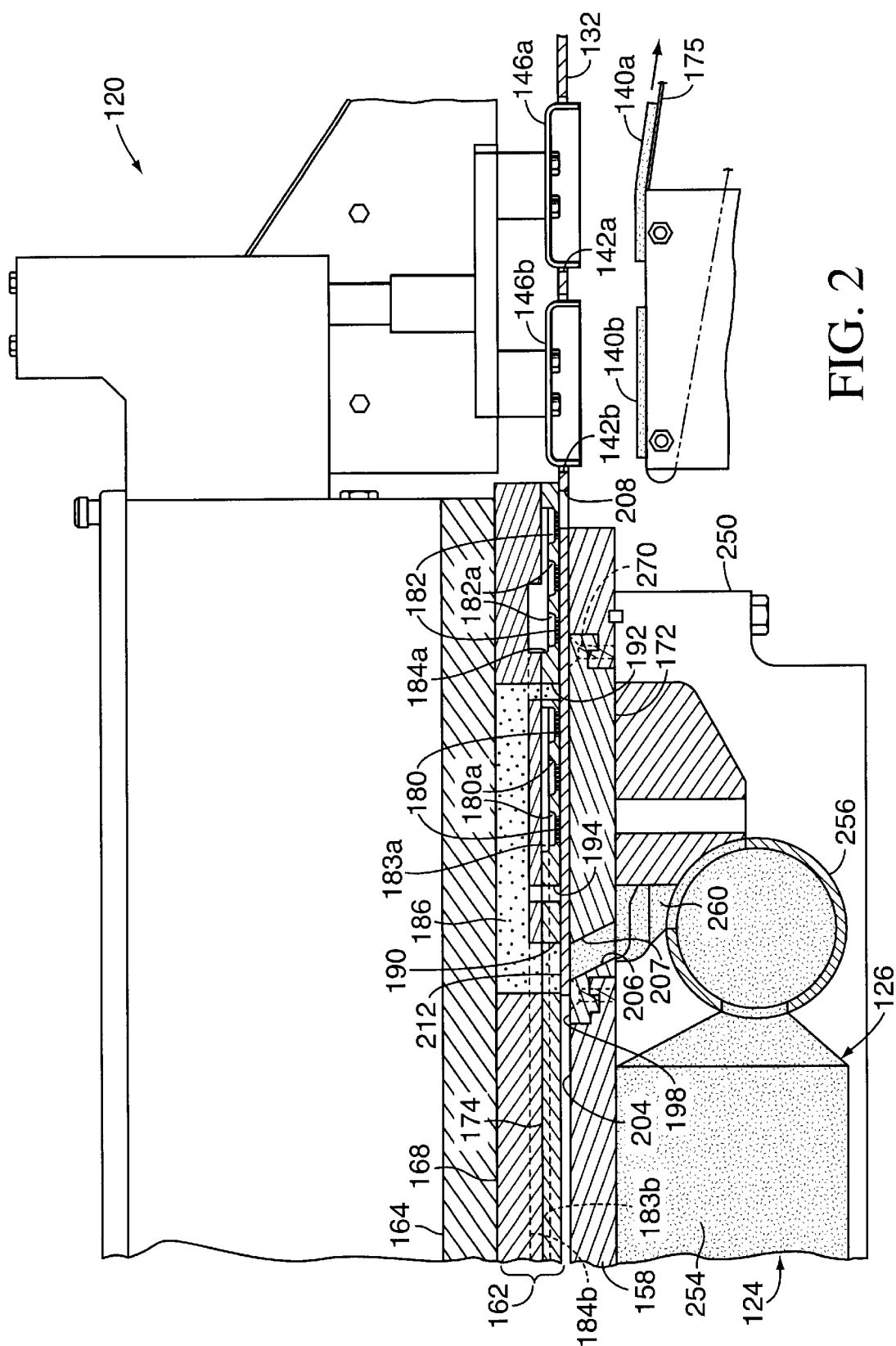
FIG. 2 is a diagrammatic sectional view of a patty-forming apparatus according to the invention, the apparatus mold plate shown in a knock-out position.
Figure 3:
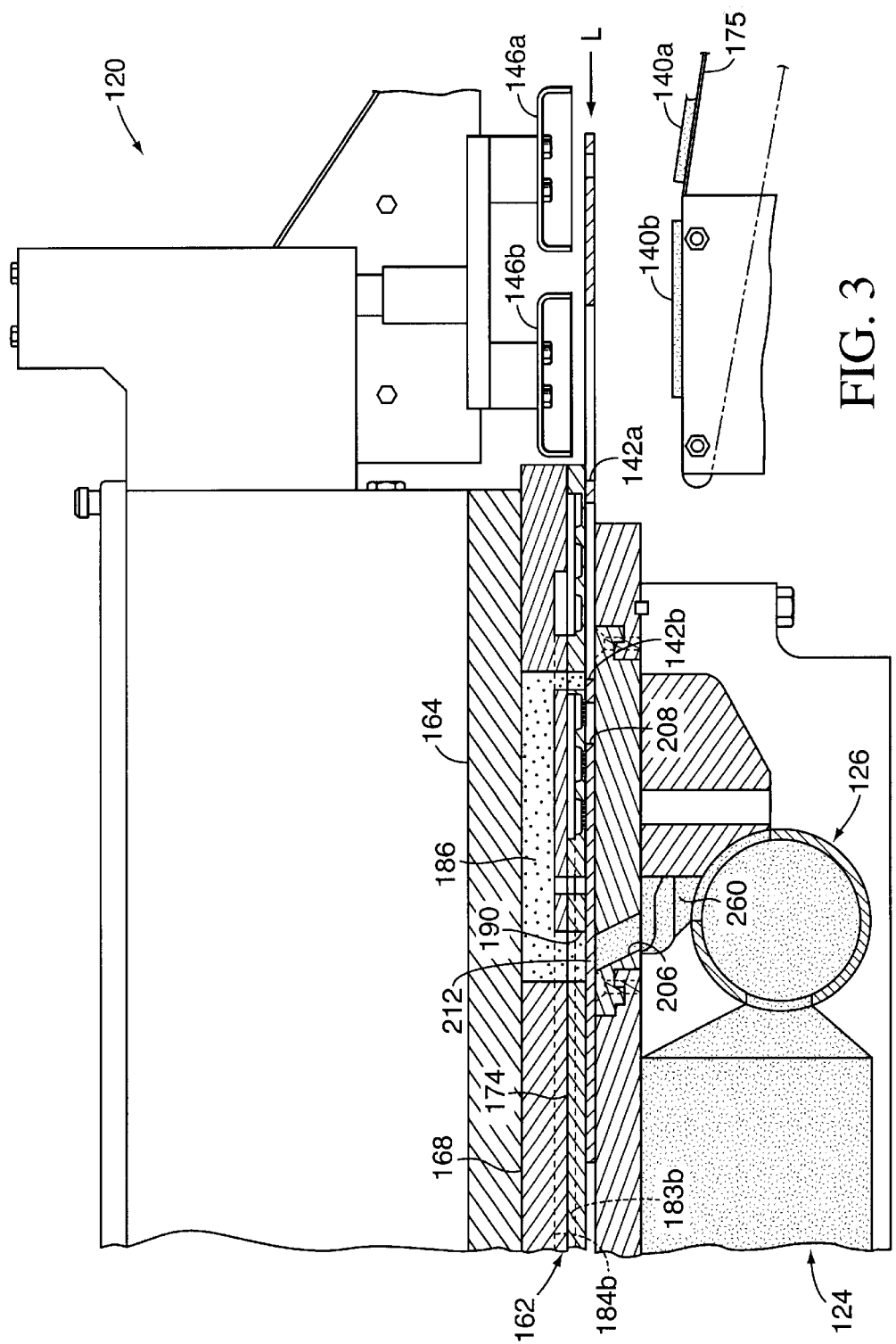
FIG. 3 is a diagrammatic sectional view of the patty-forming apparatus of FIG. 2 with the apparatus mold plate retracted a distance rearwardly toward a fill position.

FIG. 2 illustrates a food patty-forming apparatus 120 of the present invention. Except as otherwise described herein, the apparatus 120 is of a type such as described in U.S. Pat. Nos. 3,887,964; 4,372,008 and 4,821,376, herein incorporated by reference.

Figure 4:
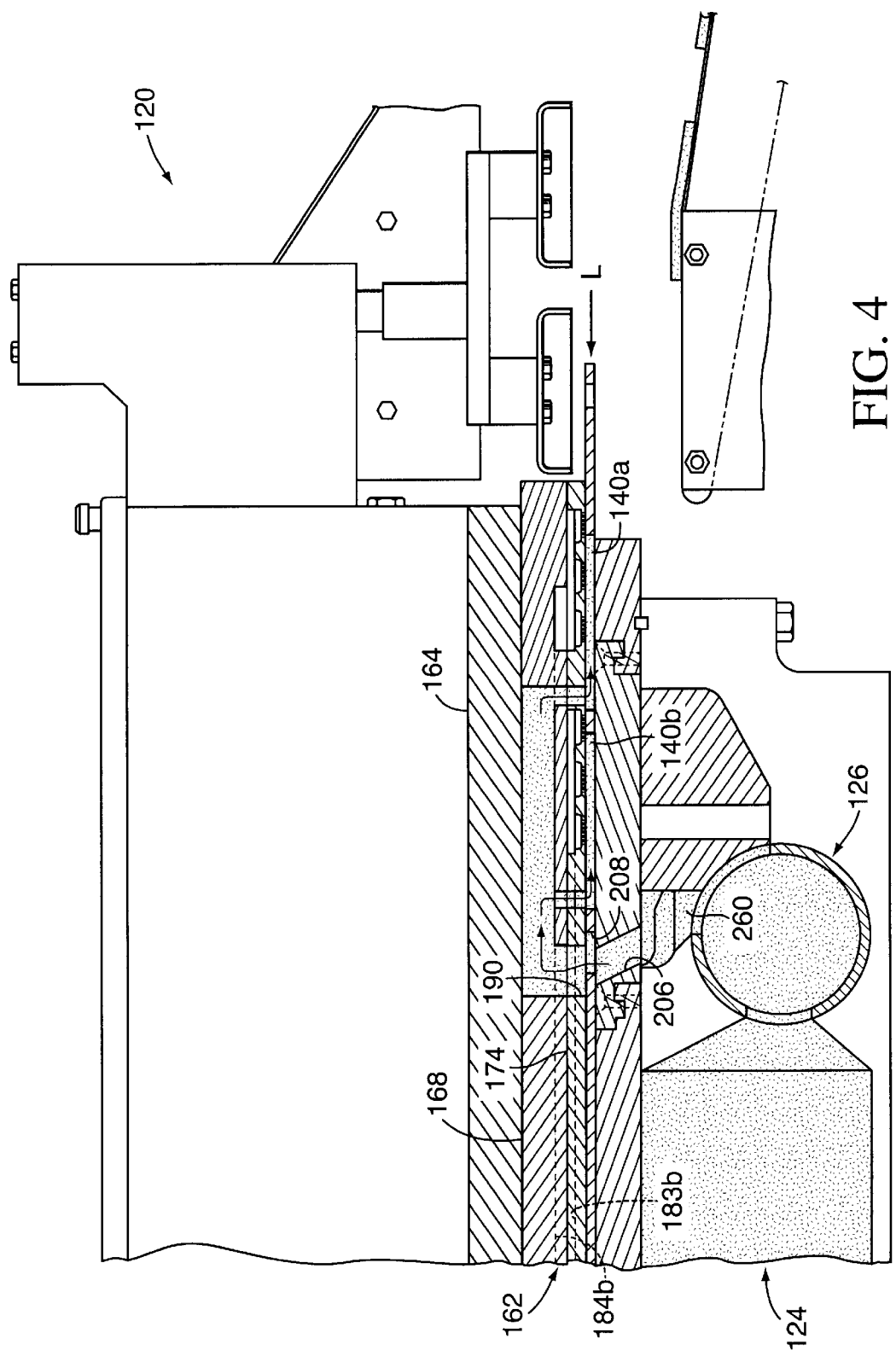
FIG. 4 is a diagrammatic sectional view of the patty-forming apparatus of FIG. 3, with the apparatus mold plate moved a further distance, nearing a fully retracted position.
Figure 5:
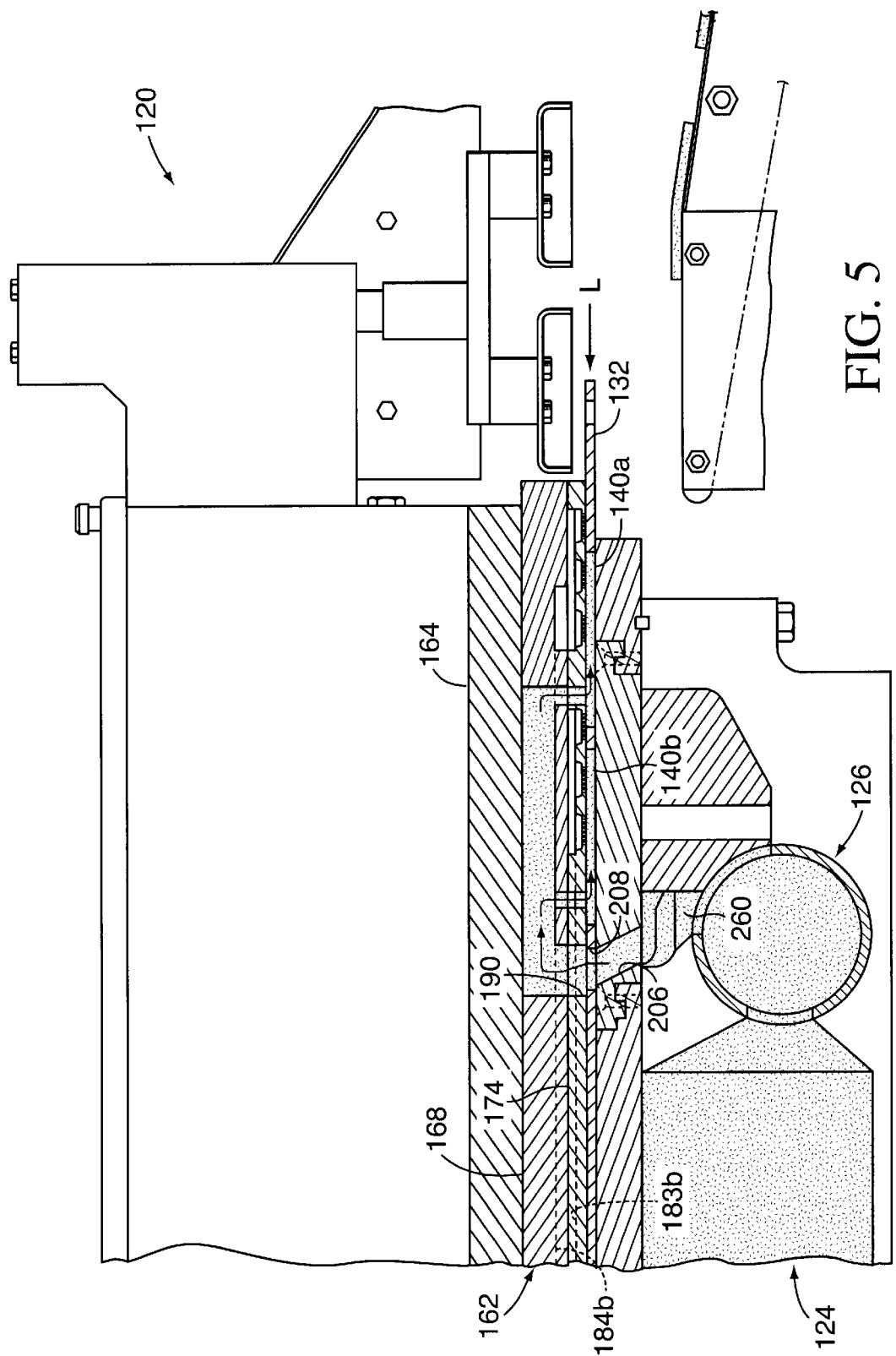
FIG. 5 is a diagrammatic sectional view of the patty-forming apparatus of FIG. 4, moved a further distance, with the apparatus mold plate at a fully retracted position.

The apparatus 120 includes a supply apparatus 124 for storing and supplying a moldable food product, such as ground beef, fish, pork, chicken, potatoes, or the like to the processing mechanism of the apparatus. The supply apparatus 124 includes a storage hopper (not shown) and a food product pump system 126. The supply apparatus can be as disclosed in U.S. Pat. Nos. 4,356,595 or 4,372,008 herein incorporated by reference. The apparatus includes a mold plate 132 that moves cyclically between a discharge or knock-out position shown in FIG. 2 and a fill position or stage shown in FIGS. 4 and 5. In the discharge position, two rows of food patties 140a, 140b which occupy two rows of mold cavities, front mold cavities 142a, and rear mold cavities 142b, respectively, within the mold plate 132, are discharged by downward movement of two rows of corresponding knock-out cups 146a, 146b, respectively. The food patties can be delivered onto a take-off conveyor 175.

According to the preferred embodiment, two rows of cavities, front cavities 142a and rear cavities 142b, are utilized, each row having six cavities (not shown). It is of course encompassed by the invention that more rows, and/or more or less cavities per row, could be used.

The mold plate 132 is guided for reciprocal movement by a support plate 158, a bottom fill plate 172, and a top fill plate structure 162. A cover plate 164 overlies the top fill plate structure 162. The top fill plate structure 162 includes a top fill plate 168, and a breather plate 174. The breather plate 174 includes breather holes 180, 182 in air communication with the front and rear cavities 142a, 142b respectively, and with lateral air channels 183a, 184a and longitudinal air channels 183b, 184b, respectively. The breather holes are recessed in dished areas 180a, 182a. Breather hole locations and patterns are disclosed in the patent application "Improved Patty-Forming Mold Plate Assembly," U.S. Ser. No. 09/545,804, filed Apr. 8, 2000, and herein incorporated by reference. The channels 183a, 183b are formed into a top surface of the breather plate 174, and the channels 184a, 184b are formed into a bottom surface of the top fill plate 168. The top fill plate 168 includes an overhead fill cavity 186 partly defined by the cover plate 164. The breather plate 174 includes a fill opening 190 and a front outlet slot 192 and a rear outlet slot 194, all open to the fill cavity 186 of the top fill plate 168.

Below the mold plate 132 is the bottom fill plate 172. The bottom fill plate 172 is fit on, and partly recessed within, the support plate 158, and includes a top surface 198 which is planar with a contiguous top surface 204 of the support plate 158. The bottom fill plate 172 is mounted to the support plate 158 by a plurality of fasteners 270. The bottom fill plate 172 includes a fill delivery channel 206 open at an outlet 207 at a top end, and flow connected at a bottom end to the pump system 126.

The mold plate includes a fill hole 208 located rearwardly of the two rows of cavities 142a, 142b. In the position shown in FIG. 2, a solid portion 212 of the mold plate 132 is interposed between the fill opening 190 and the fill delivery channel 206, blocking food product communication therebetween. When the mold plate 132 is in the position shown in FIG. 2, food product under reduced (or zero) pressure is effectively trapped above the mold plate 132 within the fill opening 190, the fill cavity 186, and the front and rear outlet slots 192, 194 (indicated in the FIGURES by speckling).

For simplicity, only one longitudinally arranged pair of the cavities 142a, 142b and one set of corresponding features, such as the knock-out cups 146a, 146b, groups of breather holes 180, 182, channels 183a, 183b, 184a, 184b, fill hole 208, delivery channel 206, fill inlet 190, fill cavity 186, and front and rear outlet slots 192, 194, are shown and described. Given that the front and rear cavities 142a, 142b would advantageously be multiplied across the width of the mold plate 132, the corresponding features can also be multiplied across the apparatus in like fashion. Alternatively, some corresponding features, such as the cavity 186, could possibly be shared by more than one pair of cavities 142a, 142b across the rows.

A housing 250 of the food product pump system 126 underlies and supports the support plate 158. Food product is pumped under pressure through a delivery channel 254, and then through a valve cylinder 256. Food product from the valve cylinder is pressurized into an expanded fill passage 260.

As the mold plate is retracted from right to left in the direction L, as illustrated progressively in FIGS. 2 through 5, the fill hole 208 is eventually positioned between the inlet fill opening 190 and the fill delivery channel 206. Pressurized food product can then begin to pass (FIG. 4) from the expanded fill passage 260, through the fill delivery channel 206 and out of the outlet 207, through the fill hole 208, through the fill opening 190, into the overhead cavity 186, through the front and rear outlet slots 192, 194 and into the mold plate cavities 142a, 142b.

Figure 6:
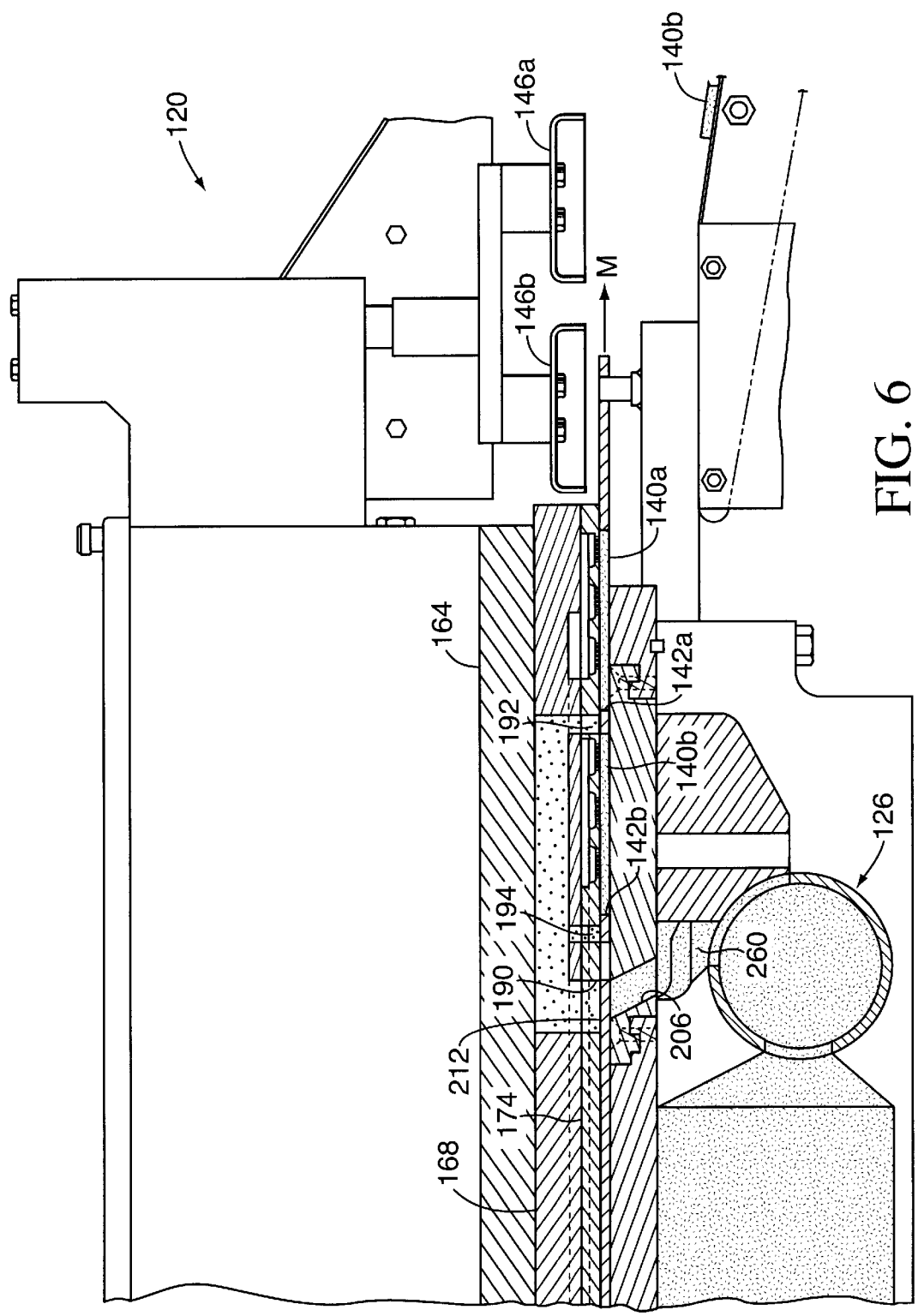
FIG. 6 is a diagrammatic sectional view of the patty-forming apparatus of FIG. 5 with the apparatus mold plate moved a distance toward the knock-out position.

As illustrated in FIG. 6, the mold plate has begun to move toward the knock-out position. Before the rear cavities 142b are exposed to the front outlet slot 192, the mold plate solid portion 212 closes off the fill opening 190 from the fill delivery channel 206. Thus, the strategic location of the mold plate fill hole 208, the delivery channel 206 and the fill opening 190 ensure that the rear cavities 142b are not subjected to pressurized food product from the front outlet slots 192 when passing thereby from either forward or reverse direction. The front cavities 142a are only fed by pressurized food product by the front outlet slots 192 and that the rear cavities 142b are only fed by pressurized food product by the rear outlet slots 194.

Figure 7:
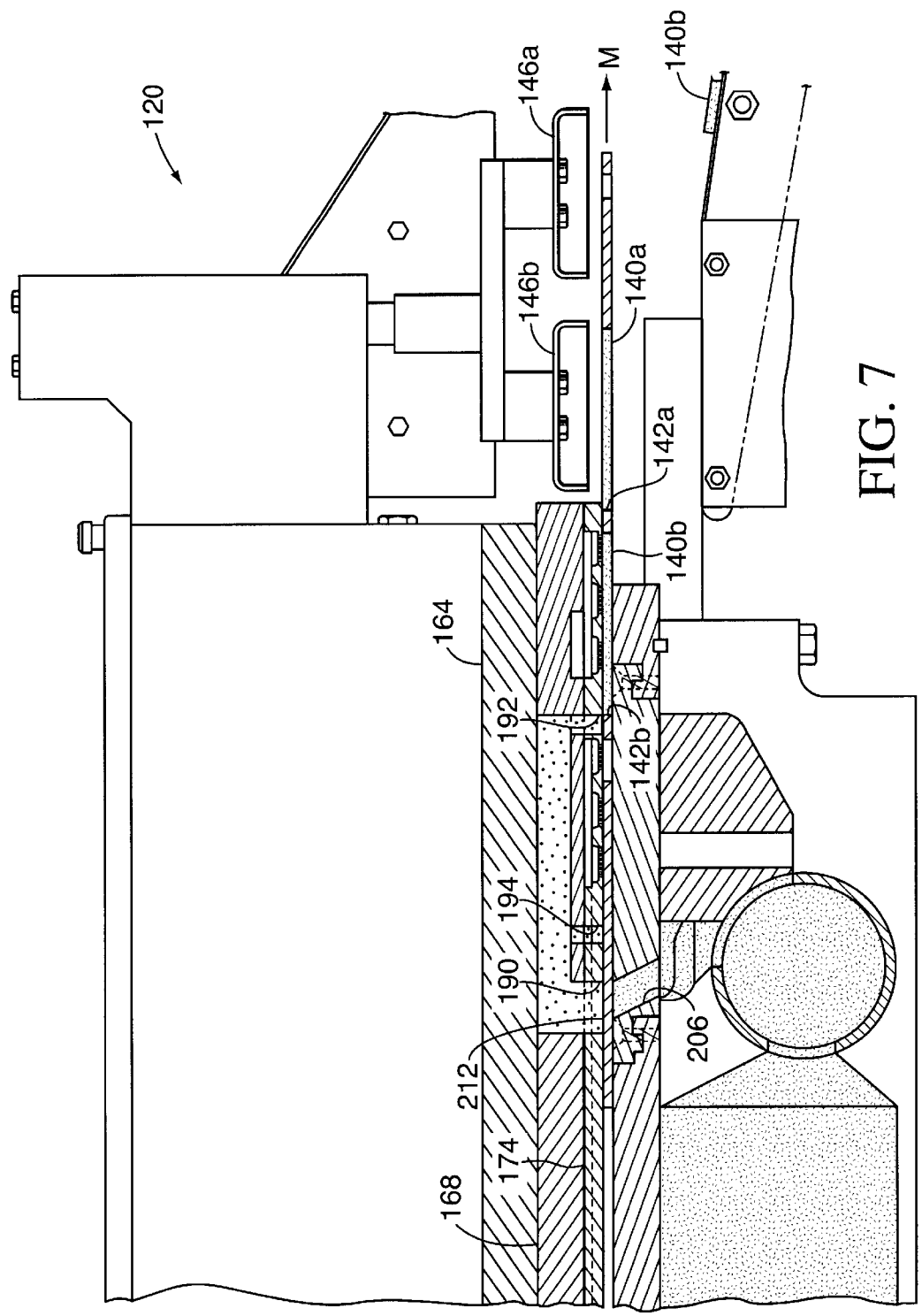
FIG. 7 is a diagrammatic sectional view of the patty-forming apparatus of FIG. 6 with the apparatus mold plate moved a further distance toward the knock-out position.

FIG. 7 shows the mold plate 132 extended toward the knock-out or discharge position, nearing the position shown in FIG. 2, wherein the cycle is repeated.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A patty-forming apparatus, comprising:
   a reciprocating mold plate having front and rear rows of mold cavities and a fill hole, said mold plate arranged to reciprocate between a mold cavity fill position and a mold cavity discharge position;
   a food product delivery path having an inlet and front and rear outlets, said front and rear outlets in fluid communication with said front and rear rows of mold cavities when said mold plate is in said fill position;
   a food product feed system having an outlet for delivering pressurized food product to said food product delivery path; and
   in said mold cavity fill position, said outlet of said food product food system is connected via said fill hole to said inlet for delivering pressurized food product from said food product feed system into said delivery path, and out of said front and rear outlets into said front and rear rows of cavities, and when said mold plate is in said mold cavity discharge position, said mold plate blocking flow from said outlet of said food product food system.

2. The apparatus according to claim 1, wherein said rows of cavities are straight rows.

3. The apparatus according to claim 1, wherein said fill hole is arranged rearwardly of said rows of cavities.

4. The apparatus according to claim 1, wherein said food product delivery path is arranged above the mold plate.

5. The apparatus according to claim 1, wherein said food product feed system is arranged below said mold plate.

6. The apparatus according to claim 1, comprising a breather plate arranged above the mold plate and having breather holes open into said front and rear rows of cavities, and air discharge channels in fluid communication with said breather holes.

7. The apparatus according to claim 1, wherein said fill hole is circular.

8. The apparatus according to claim 1, comprising front and rear knock-out cups arranged to vertically reciprocate to remove patties from said front and rear mold cavities at said discharge position.

9. The apparatus according to claim 1, wherein said fill hole is arranged rearwardly of said rows of cavities, said food product delivery path is arranged above the mold plate, said food product feed system is arranged below said mold plate, and further comprising a breather plate arranged above the mold plate and having breather holes open into said front and rear rows of cavities and air discharge channels in fluid communication with said breather holes.

10. A patty-forming apparatus, comprising:
    a bottom fill plate having a food product delivery channel communicating with a source of pressurized food product;
    a mold plate reciprocally mounted over said bottom fill plate and having at least a first and a second row of cavities, and a fill hole;
    a top fill plate structure arranged overlying said mold plate and providing a fill channel, said fill channel being arranged to be in fluid communication with said first and second mold cavities when said mold plate is in a fill position; and
    in said fill position, said food product delivery channel is in fluid communication with said fill hole, said fill channel and said first and second rows of the cavities, and when said mold plate is in a discharge position, said fill hole is no longer in fluid communication with said delivery channel and said mold plate blocks said delivery channel.

11. The apparatus according to claim 10, wherein said rows of cavities are straight rows.

12. The apparatus according to claim 10, wherein said fill hole is arranged rearwardly of said rows of cavities.

13. The apparatus according to claim 10, wherein said top fill plate structure includes a breather plate, said breather plate having first and second groups of breather holes open into said first and second rows of cavities respectively, and air discharge channels in air communication with said breather holes.

14. The apparatus according to claim 10, wherein said fill hole is circular.

15. The apparatus according to claim 10, comprising front and rear knock-out cups arranged to vertically reciprocate to remove patties from said first and second mold cavities at said discharge position.

16. The apparatus according to claim 10, wherein said fill hole is arranged rearwardly of said rows of cavities, wherein said first and second rows of cavities are straight rows, wherein said top fill plate structure includes a breather plate, said breather plate having first and second groups of breather holes open into said first and second rows of cavities respectively, and air discharge channels in air communication with said breather holes, and wherein said apparatus comprises front and rear knock-out cups arranged to vertically reciprocate to remove patties from said first and second mold cavities at said discharge position.

* * * * *

UNITED STATES PATENT AND TRADEMARK OFFICE
CERTIFICATE OF CORRECTION

PATENT NO.    : 6,454,559 B1
DATED         : September 24, 2002
INVENTOR(S)   : Scott A. Lindee It is certified that error appears in the above-identified patent and that said Letters Patent is hereby corrected as shown below:

Column 6,
Lines 7 and 14, replace "food" with -- feed --.

Signed and Sealed this

First Day of July, 2003

JAMES E. ROGAN
*Director of the United States Patent and Trademark Office*